(12) United States Patent
Nemirovsky et al.

(10) Patent No.: US 11,935,032 B2
(45) Date of Patent: Mar. 19, 2024

(54) NON-CONTACT MEDIA CONTROL SYSTEM AND METHOD

(71) Applicant: NERDY BUNNY I, LLC, Farmington Hills, MI (US)

(72) Inventors: Victor Nemirovsky, Birmingham, MI (US); Itai Ben-Gal, West Bloomfield, MI (US)

(73) Assignee: NERDY BUNNY I, LLC, Farmington Hills, MI (US)

(*) Notice: Subject to any disclaimer, the term of this patent is extended or adjusted under 35 U.S.C. 154(b) by 0 days.

(21) Appl. No.: 17/976,378

(22) Filed: Oct. 28, 2022

(65) Prior Publication Data

US 2023/0047327 A1 Feb. 16, 2023

Related U.S. Application Data

(63) Continuation of application No. 17/326,251, filed on May 20, 2021, now Pat. No. 11,544,696.

(60) Provisional application No. 63/027,408, filed on May 20, 2020.

(51) Int. Cl.
*G06Q 20/32* (2012.01)
*G06Q 20/20* (2012.01)

(52) U.S. Cl.
CPC ....... *G06Q 20/3276* (2013.01); *G06Q 20/202* (2013.01); *G06Q 20/208* (2013.01); *G06Q 20/3278* (2013.01)

(58) Field of Classification Search
None
See application file for complete search history.

(56) References Cited

U.S. PATENT DOCUMENTS

| | | | |
|---|---|---|---|
| 10,656,806 B2 | 5/2020 | Jhawar | |
| 2012/0151509 A1 | 6/2012 | McCarthy | |
| 2012/0210205 A1* | 8/2012 | Sherwood | ........ H04N 21/43615 715/234 |
| 2017/0351757 A1 | 12/2017 | Strober | |

* cited by examiner

*Primary Examiner* — Joseph W. King
(74) *Attorney, Agent, or Firm* — The Dobrusin Law Firm, P.C.; Daniela M. Thompson-Walters

(57) ABSTRACT

The present disclosure relates to a method for conducting a transaction while in proximity of a local retail network operated by a retail point of sale comprising: a) receiving an identification signal related to one or more media identifiers associated with a media control device and from a user mobile device, wherein the user mobile device is connected to a first network; b) transmitting data to the user mobile device to render a media control interface on the user mobile device; c) receiving one or more instruction signals from the user mobile device, wherein the one or more instruction signals are related to one or more outputs of one or more media devices in proximity to the user mobile device; d) transmitting the one or more instruction signals to a media control device, such that the media control device instructs the one or more media devices to generate the one or more outputs; e) disabling a connection between the user mobile device and the media control device based upon occurrence of a pre-determined condition.

18 Claims, 4 Drawing Sheets

NON-CONTACT MEDIA CONTROL SYSTEM AND METHOD

FIELD

The present teachings relate to a system and method which may provide a user a means of interacting with one or more media devices within an establishment while avoiding physical contact with one or more controls of the media devices. The present teachings may be particularly useful for use with retail establishments with secure networks, by allowing a user mobile device to interact with one or more media devices via one or more user networks separate from the secure network.

BACKGROUND

While at a retail establishment, often individuals have the opportunity to interact with media devices to enjoy an in-location user experience. These media devices typically include televisions, screens, speakers, headphones, lighting, and the like. Individuals can interact with these media devices via buttons, touchscreens, and other tactile inputs. Interaction may include actions like learning more about the devices, having music play from a certain set of speakers or headphones, changing what television is turned on at a retail display, having a video play on a television, turning on one or more lights, playing one or more video games, ordering food and/or drinks, virtually trying on apparel, and the like. The buttons, touchscreens, and tactile inputs may be part of the media device, in direct communication attached to the media device, or even in indirect communication with the media device, but are located at and part of the retail establishment. These tactile inputs may pose a concern when it comes to the transmission of pathogens.

One or more diseases, such as COVID-19, influenza, and even the common cold, may have pathogens which remain active on surfaces for hours and even days. As tactile inputs may be located in high traffic areas of a retail establishment and are connected to electrical components, it can be difficult to adequately and frequently sanitize these tactile inputs. As awareness increases of these diseases and how they spread, customers may become hesitant to interact with the media devices, resulting in lost sales at the retail establishment. Thus, what is needed is a method for a user to interact with these media devices while avoiding contact with equipment on display at the retail establishment.

Adding onsite user interfaces to interact with media devices at a retail establishment can prove costly, both initially and overtime. The onsite user interfaces may be part of kiosks or displays associated with media devices or other goods and services available for purchase at the retail establishment. These onsite user interfaces not only create an installation cost associated with their purchase and installation, but also ongoing maintenance costs for cleansing and maintaining. Additionally, many of these onsite user interfaces are in the form of tablets or other personal computing devices and may be subject to damage by customers or even theft. Thus, what is needed is a method to provide a user interface to interact with goods and services available at a retail establishment without having to install onsite user interfaces.

Typically, consumers tend to carry smart phones and tablets on their person. These smart phones and tablets are generally able to be connected to wireless networks. Most retail establishments have onsite local retail networks. These local networks have point-of-sale equipment connected thereto, including terminals, display units, receipt printers, cash registers, and the like. Additionally, these local networks have employee computing equipment, administrative equipment, customer files, and even media devices, and the like, connected thereto. The onsite local retail networks are typically secure and do not permit guests, such as consumers, to connect. Thus, what is needed is a means of easily communicating with the media devices located within a retail network while avoiding the use of the local retail network and exposing the local retail network to security concerns.

SUMMARY

The present disclosure relates to a method for conducting a transaction while in proximity of a local retail network operated by a retail point of sale comprising: a) receiving an identification signal related to one or more media identifiers associated with a media control device and from a user mobile device, wherein the user mobile device is connected to a first network; b) transmitting data to the user mobile device to render a media control interface on the user mobile device; c) receiving one or more instruction signals from the user mobile device, wherein the one or more instruction signals are related to one or more outputs of one or more media devices in proximity to the user mobile device; d) transmitting the one or more instruction signals to a media control device, such that the media control device instructs the one or more media devices to generate the one or more outputs; e) disabling a connection between the user mobile device and the media control device based upon occurrence of a pre-determined condition.

The present teachings provide for a method to control one or more media devices while avoiding direct contact with equipment located at a retail establishment. The present teachings provide for a method for a user mobile device to communicate with one or more media devices while both are connected to separate networks. The present teachings provide for a user mobile device which is able to control a media device while not exposing the local retail network to any security risks associated with the user mobile device. The system and method may allow for a user to use a typically carried and trusted user mobile device to control one or more media devices within the retail establishment.

The present teachings provide an unconventional approach of establishing communication between a user mobile device and a media device such that the user mobile device is in control of the outputs of the media device. The method is unconventional as a continuous and secure connection may be established between the one or more user mobile devices and control server via a user network while another continuous and secure connection is established between the control server and one or more media devices via a local retail network. A typical approach would include attempting to figure out how to have the user device connect directly to the local retail network to avoid security breach concerns. These approaches might require user accounts, user credentials, a custom application, and/or even the use of a virtual private network (VPN) to maintain security. The system and method of the present teachings provides an unconventional approach by providing, in essence, an ad-hoc connection which is still secure, yet avoids the need for user accounts, credentials, custom applications, and/or the use of VPN. Another typical approach would include only providing for intermittent communication between the devices. The continuous and secure connections allow for one or more instruction signals from a control server to be quickly received and interpreted by a media control device and be transmitted toward one or more media device. The continuous and secure connections may allow for instruction inputs on a user mobile device to be quickly rendered as media outputs within a near instantaneous time frame such that a user is able to enjoy and sense that they are immediately causing the actions on a media device without noticing a lag. A near instantaneous time frame may be about 0.01 seconds or greater to about 0.5 seconds or less.

DETAILED DESCRIPTION

Figure 1:
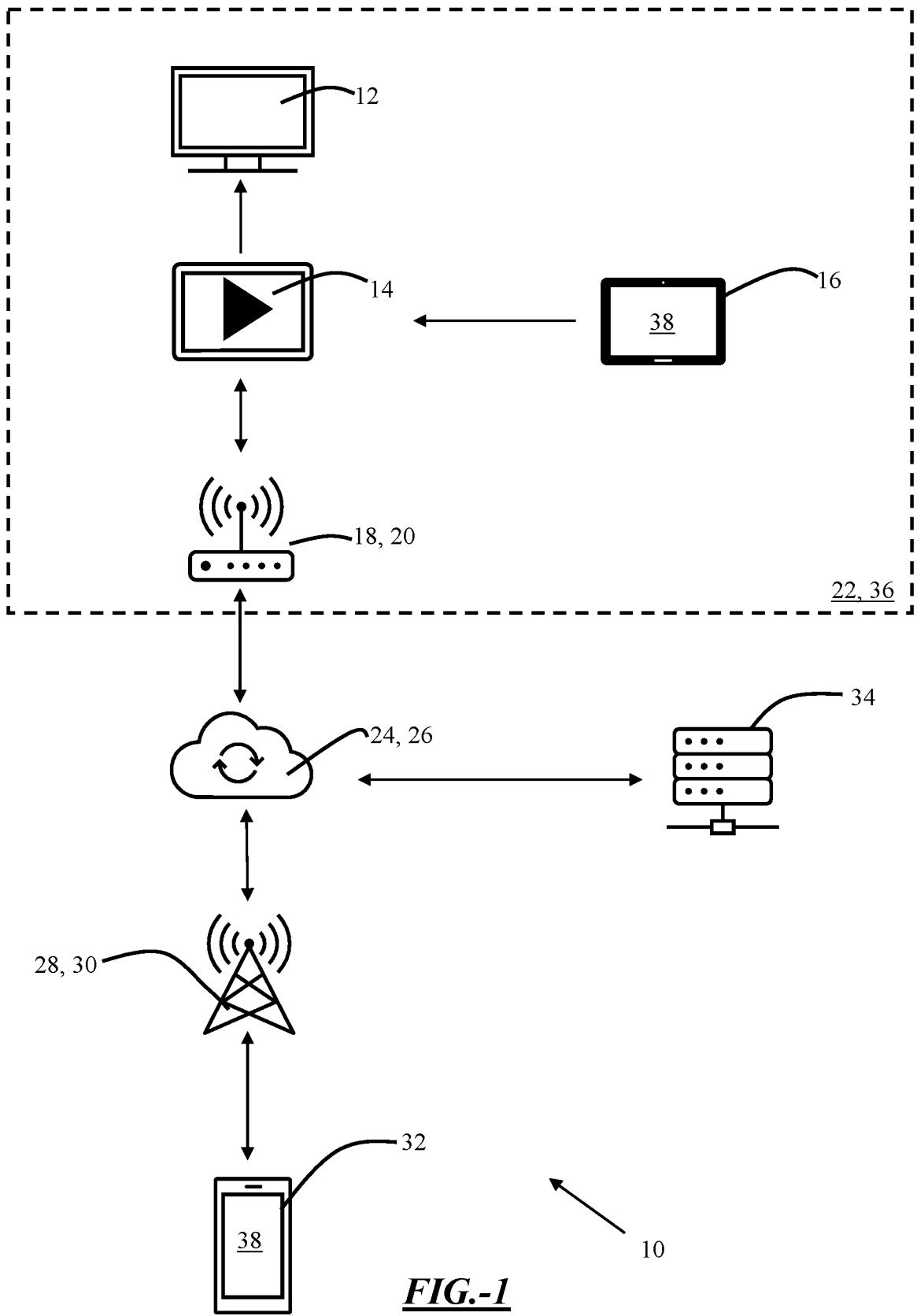
FIG. 1 illustrates a network schematic with a media control device on a retail network in communication with a user mobile device on a separate network.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

System

The present teachings relate to a system. The system may allow for a user to interact with one or more media devices without direct contact. The system may allow for a user to avoid contact with any media control devices within a retail establishment. The system may allow for a user to use a typically carried and trusted user mobile device to control one or more media devices within the retail establishment. The system may allow for a single user to interact with one or more media devices while preventing others from interacting with the same one or more media devices. The system may allow for multiple users to interact with the same one or more media devices while preventing interaction between the users. The system may allow for interaction between multiple users while interacting with the same one or more media devices. The system may include one or more media devices, media control devices, onsite user interfaces, media identifiers, user mobile devices, networks, the like, or any combination thereof.

The system may be at least partially located within a facility. The facility may provide one or more goods and/or services for sale to a user. The facility may include a retail establishment. A retail establishment may include one or more establishments related to hospitality, tourism, goods retail, services, the like, or any combination thereof. A retail establishment may provide one or more goods and/or services for sale to consumers. One or more goods and/or services may be associated with a display. The display may include and/or be free of a kiosk, onsite user interface, or both. A retail establishment may be established within a facility. A retail establishment may be a retail point-of-sale location. The facility may include a local retail network, one or more media devices, one or more media control devices, one or more onsite user interfaces, one or more control servers, the like, or any combination thereof. The facility may include one or more media devices therein.

The system may include one or more media devices. The one or more media devices may allow for a user to interact with one or more goods and/or services related to the retail establishment. One or more goods and/or services may include the media devices themselves, or other goods and/or services related to the retail establishment, or a combination thereof. One or more other goods may include apparel, food, beverages, wearable accessories, exercise equipment, athletic equipment, the like, or any combination thereof. One or more services may include virtual tours, hotel accommodations, hair cuts and styles, make-up application, athletic training and analysis, the like, or any combination thereof. The one or more media devices may allow for a user to experience one or more sensory experiences. The one or more media devices may be located within a retail establishment. The one or more media devices may provide one or more outputs. The one or more outputs may include one or more sensory outputs. One or more sensory outputs may be one or more outputs able to be sensed by an individual. One or more outputs may include one or more images, sounds, tactile feedback, scents, the like, or any combination thereof. One or more media devices may include one or more devices which are able to be controlled via one or more analog instructions, digital instructions, or both. The one or more outputs may be automatically initiated by one or more processors of the media device. Upon receiving one or more output instructions, the one or more processors may automatically access one or more computer executable instructions stored in one or more storage mediums of the media device to automatically execute the one or more outputs. One or more media devices may include one or more home appliances (e.g., stove, microwave, washer, etc.), fitness devices (e.g., smart weight systems, smart treadmills, smart weight scales, etc.), entertainment devices (e.g., televisions, speakers, headphones, etc.), computing devices (e.g., laptops, tablets, graphic user interfaces (i.e., screens), etc.), imaging devices (e.g., cameras, video cameras), communication devices (e.g., mobile phones), gaming devices (e.g., gaming consoles), wearable devices (e.g., smart watches, smart personal monitors, etc.), vehicles, vehicle devices (e.g., navigation systems, infotainment systems), toys (e.g., drones, remote control cars, etc.), the like, or any combination thereof. The one or more media devices may be in communication with and/or part of an onsite network. The one or more media devices may be in communication with one or more media control devices. The one or more media devices may be in one-way or two-way communication with media control devices. One-way may be defined as only capable of receiving one or more instruction signals from a media device.

The system may include one or more media control devices. One or more media control devices may function to control one or more outputs of one or more media devices, transmit one or more instruction signals to one or more media devices, receive one or more instruction signals from one or more control servers, receive one or more instruction signals from one or more user interfaces, or any combination thereof. One or more media control devices may include one or more media output and/or output instructions stored therein. One or more media control devices may function to transmit one or more media outputs, output instructions, or both to the one or more media devices such that the media device provides the output. One or more media control devices may include the ability for storing images, audio, and the like for output by the one or more media devices. One or more media control devices may have one or more video engines, be compatible with one or more networks, and the like. One or more media control devices may provide a secure connection to one or more networks. A secure connection may include one or more network sockets, protocols, or both. One or more network sockets may include a TCP/IP socket. One or more protocols may include transport layer security (TLS). One or more media devices may include one or more media device connections, One or more media device connections may include HDMI ports, digital/analog audio output, the like, or any combination thereof, Exemplary media control devices may be those provided by BrightSign®, incorporated by reference herein. For example, the XD Standard and Expanded I/O Players by BrightSign® may be suitable as media control devices, incorporated herein by reference.

The system may include one or more computing devices. The one or more computing devices may function to allow a user to interact a media control interface, connect to one or more networks, control one or more outputs of a media device, convert one or more inputs to signals, receive and transmit one or more signals, execute one or more computer-readable instructions, or any combination thereof. The one or more computing devices may include and/or be in communication with one or more processors, storage mediums, servers, networks, user interfaces, media devices, other computing devices, the like, or any combination thereof. The one or more or more computing devices may communicate via one or more networks, servers, the like, or any combination thereof. One or more computing devices may include one or more facility computing devices, system computing devices, personal computing devices, or any combination thereof. One or more facility computing devices, system computing devices, and/or personal computing devices may include one or more personal computers (e.g., laptop or desktop), mobile devices (e.g., mobile phone, tablet, smart watch, etc.), the like, or any combination thereof. One or more facility computing devices, system computing devices, or both may include one or more control servers, media control devices, media devices, the like or a combination thereof. One or more facility computing devices, system computing devices, or both may be associated with one or more facilities, networks associated with the facilities (e.g., onsite network), and/or the like. One or more personal computing devices may be associated with one or more users, one or more individuals employed by the facility, or both. One or more computing devices may include one or more one or more user mobile devices, onsite user interfaces, control servers, media control devices, media devices, the like, or any combination thereof. One or more computing devices may be connected to one or more networks. One or more computing devices may be connected to the same and/or separate networks as other computing devices. For example, a user mobile device may be connected to a first network (e.g., cellular network, local guest network) separate from a local retail network. One or more computing devices may include one or more user interfaces. One or more computing devices may include one or more image sensors, frequency sensors, or both. One or more image sensors may be part of a camera of a computing device. One or more frequency sensors may be part of one or more wireless transceivers of a computing device. One or more wireless transceivers may be configured to communication via radio frequency, Bluetooth®, near field communication (NFC), the like, or any combination thereof.

One or more computing devices may include one or more user interfaces. The one or more user interfaces may function to display one or more controls, information, or both related to a media device; receive one or more instruction inputs; display one or more media control interfaces; the like, or any combination thereof. The one or more user interfaces may include one or more graphic user interfaces (GUI), audio interfaces, image interfaces, the like, or any combination thereof. One or more graphic user interfaces may function to display one or more media control interfaces, allow for a user providing one or more instruction inputs, displaying information about one or more media devices, or any combination thereof. The one or more graphic interfaces may include one or more screens. The one or more screens may be a screen located on a computing device. The one or more screens may be a screen on a mobile computing device, non-mobile computing device, or both. The one or more graphic interfaces may include and/or be in communication with one or more user input devices, audio interfaces, image interfaces, the like, or any combination thereof. The one or more user input devices may allow for receiving one or more inputs from a user. One or more inputs may include tactile inputs, audio inputs, optical inputs, the like, or a combination thereof. The one or more input devices may include one or more buttons, wheels, keyboards, switches, mice, joysticks, touch pads (i.e., a touch-sensitive area, provided as a separate peripheral or integrated into a computing device, that does not display visual output), touch-sensitive monitor screens, microphones, cameras, the like, or any combination thereof. The one or more input devices may be integrated with a graphic user interface. An audio interface may function to project sound to a user and/or receive sound from a user. An image interface may function to capture, receive, display, and/or transmit one or more images, video, or both. An image interface may include one or more cameras. One or more cameras may include one or more image sensors. A user interface may function to display and/or navigate through one or more media control interfaces.

One or more user interfaces may include one or more media control interfaces. The one or more media control interfaces may function to receive one or more instruction inputs; display an interface related to one or more media devices on a computing device; allow for a user to interact with and/or control a media device without requiring contact between the user and the media device or any other equipment part of a local retailer network; or any combination thereof. The one or more media control interfaces may be suitable for displaying on one or more user interfaces. The one or more media control interfaces may be suitable for having a user interact via the one or more user interfaces. The one or more media control interfaces may be associated with one or more media devices, media control devices, media identifiers, the like, or any combination thereof. One or more medial control interfaces may be generated upon a user mobile device receiving a signal from one or more media identifiers, receiving one or more website addresses, the like, or any combination thereof. One or more media control interfaces may include one or more webpages, applications, or both. One or more media control interfaces may be accessible without the need for user credentials, a user account, a VPN, a dedicated application, or any combination thereof. One or more media control interfaces may display information, controls, or both related to one or more media devices. One or more controls may be associated with one or more outputs of one or more media devices. One or more instruction inputs may include one or more interactions between a user and a media control interface. One or more media control interfaces may reside within one or more computing devices, be accessible by one or more computing devices, or both. One or more media control interfaces may reside on one or more servers, be accessible by one or more personal computing devices, or both. One or more media control interfaces may reside on one or more control servers. One or more media control interfaces may be accessible by one or more user mobile devices, onsite user interfaces, or both. One or more media control interfaces may be generated on a user interface upon a user mobile device receiving an identification signal from a media identifier.

The system may include one or more media identifiers. The one or more media identifiers may function to generate a media control interface on a user mobile device, transmit an identification signal to a user mobile device, provide access to one or more media devices, restrict access to one or more media devices, or any combination thereof. The one or more media identifiers may include one or more graphic identifiers, frequency identifiers, the like, or any combination thereof. One or more graphic identifiers may include one or more quick response (QR) codes, universal product codes (UPC), barcodes, bokodes, the like, or any combination thereof. The one or more frequency identifiers may include one or more radio frequency identification tags, Bluetooth® beacons, near field communication (NFC) tags, the like, or any combination thereof. The one or more media identifiers may be affixed to, affixed nearby, on display nearby, on display as part of, or any combination thereof one or more media devices, onsite user interfaces, media control devices, the like, or any combination thereof. For example, one or more media identifiers may be located on one or more display shelves of one or more media devices. As another example, one or more media identifiers may be affixed to one or more media devices.

One or more media identifiers may be static, dynamic, or both. Dynamic media identifiers may be particularly useful in avoiding unintentional, mischievous, or even malicious interactions with one or more media devices. A media identifier may expire and be refreshed to a new media identifier once it has issued an identification signal. By having the media identifiers expire, this avoids users capturing and/or otherwise saving the one or more media identifiers for use at a later time. For example, controlling the one or more media devices offsite at a later time to display inappropriate content, can be avoided as the media identifier is no longer valid at a later time. Dynamic media identifiers may also be advantageous in multi-user shared experiences. A dynamic media identifier may expire once an identification signal has been transmitted. A dynamic media identifier may be replaced with a subsequent, refreshed media identifier. A refreshed media identifier, once it has issued an identification signal, may communicate to a control server that a subsequent user is interacting with the one or more media devices. One or more media identifiers may be secure (e.g., encrypted). The one or more media identifiers may store data related to one or more media devices, media control devices, media control interfaces, retail location, a pre-set time frame for usage, the like, or any combination thereof. For example, the one or more media identifiers may store data related to a media control interface in the form of a webpage.

The system of the present disclosure may be integrated into, in communication with, and/or include one or more networks. The computing devices may be in selective communication with one or more networks. One or more networks may allow for one or more user mobile devices, media control devices, or both to communicate with one or more control servers. One or more networks may allow for two or more other separate networks to communicate indirectly. The one or more networks may be formed by placing two or more computing devices in communication with one another. One or more networks may include one or more communication hubs (e.g., routers, firewalls, switches, access points), computing devices, processors, databases, servers, memory storage devices, media devices, the like, or any combination thereof. One or more computing devices of the system may be directly connected to one another without the use of a communication hub. One or more networks may be connected to one or more other networks. One or more networks may include one or more local area networks ("LAN"), wide area networks ("WAN"), virtual networks ("VLAN"), virtual private network ("VPN"), intranet, Internet, cellular networks, the like, or any combination thereof. The network may be temporarily, semi-permanently, or permanently connected to one or more computing devices, or any combination thereof. One or more networks may allow for one instruction signals to be transmitted from one or more computing devices to one or more other computing devices. or more computing devices to be connected to the computing device to transmit one or more data signals to the one or more computing devices, receive one or more data signals from the one or more computing devices, or both. The one or more networks may include an onsite network, external network, user network, the like, or any combination there.

The one or more networks may include one or more user networks. One or more user networks may allow for one or more user mobile devices to interact with the Internet, other mobile devices, and/or the like; send and/or receive one or more signals from one or more control servers; send and/or receive one or more signals to one or more onsite networks, external networks, or both; send and/or receive one or more signals to one or more media device controllers, media devices, or both; or any combination thereof. One or more user networks may be located onsite at one or more retail establishments, overlap one or more retail establishments, or both. One or more user networks may be separate from and not in direct communication with one or more onsite networks (e.g., "local retail network"). One or more user networks may include one or more cellular networks, local networks, wireless networks, wide area networks, inter networks, the like, or any combination thereof. A cellular network may be a primary network of a user mobile device. One or more local networks may include one or more networks located at one or more retail establishments. One or more local guest networks may be separate from one or more local retail networks. For example, one or more local networks may include one or more guest wireless networks at a retail establishment. As another example, one or more cellular networks may include one or more cellular networks having coverage which overlaps a retail establishment, such as one in which the user mobile device is located. The one or more user networks may be in communication with one or more onsite (e.g., "local retail network") via one or more external networks. The one or more user networks may be in two-way communication with one or more external networks.

The one or more user networks may include one or more cellular networks. One or more cellular networks may allow for a user to avoid having to connect to another network, allow a use to use the primary network of a user mobile device, or both. A cellular network may have an operational radius of 1 km or greater. A cellular network may transmit communications via radiofrequency. A cellular network may transmit communications via radiofrequency other than at frequencies of about 2.4 GHz, 5 GHz, or both. A cellular network may transmit communications at frequencies of about 4 GHz or less, about 3 GHz or less, about 2 GHz or less, or even about 1 GHz or less. For example, a cellular network may transmit communications at frequencies of about 600 MHz A cellular network may be a third generation (3G) network, fourth generation (4G) network, long-term evolution (LTE) network, fifth generation (5G) network, any subsequent network generation, the like, or any combination thereof. A cellular network may be a low-band network, mid-band network, high-band network, the like, or any combination thereof. A low-band network may communicate at about 600 to about 700 MHz; provide download speeds higher than about 30 Mbps, about 50 Mbps, or even about 100 Mbps; or both. A mid-band network may communicate at about 2.5 to about 3.7 GHz; provide download speeds higher than about 100 Mbps, about 500 Mbps, or even about 900 Mbps; or both. A high-band network may communicate at about 25 to about 39 GHz; provide download speeds higher than about 1 Gbps; or both. The one or more cellular networks may be in communication with one or more onsite (e.g., "local retail network") via one or more external networks.

The one or more networks may include one or more onsite networks. One or more onsite networks may function to connect one or more devices at a retail establishment with one another, provide secure data transmission within a retail establishment, connect to one or more point-of-sale computing devices, the like, or any combination thereof. One or more onsite networks may be secure. One or more onsite networks may be encrypted. One or more onsite networks may include one or more local networks, wireless networks, wide area networks, inter networks, the like, or any combination thereof. One or more onsite networks may prevent access from one or more unauthorized devices. Unauthorized devices may include user mobile devices. One or more onsite networks may be in two-way communication with one or more external networks. One or more onsite networks may be in communication with one or more control servers. One or more onsite networks may be in two-way communication with one or more control servers. The control server may be part of the onsite network, part of an external network, or both. One or more onsite networks may be a network located at a retail establishment (e.g., retail point-of-sale location). One or more onsite networks may be one or more local retail networks. One or more onsite networks may allow access to one or more external networks via one or more firewalls.

The one or more networks may include one or more external networks. One or more external networks may function to connect an onsite network with a user network, connect a control server to an onsite network and/or a user network, or both. One or more external networks may be located remote from a retail establishment, a user mobile device, or both. One or more external networks may include a wide area network. A wide area network may include the Internet. One or more external networks may be accessible by one or more user networks, onsite networks, or both. One or more external networks may be in communication with one or more control servers. One or more external networks may be in two-way communication with one or more control servers. One or more external networks may be in direct communication with the one or more control servers. One or more external networks may be in communication with one or more user networks, onsite networks, or both. One or more external networks may be in two-way communication with one or more user networks, onsite networks, or both.

One or more computing devices may include one or more processors. The one or more processors may function to analyze one or more signals and/or data from one or more computing devices, convert one or more inputs into one or signals, convert one or more signals into one or more outputs, or a combination thereof. The one or more processors may be located in one or more computing devices. The one or more processors may or may not be cloud-based (e.g., remote from other portions of the system). One or more processors may include a single or a plurality of processors. One or more processors may be in communication with one or more other processors. The one or more processors may function to process data, execute one or more algorithms to analyze data, or both. Processing data may include receiving, transforming, outputting, executing, the like, or any combination thereof. One or more processors may be part of one or more hardware, software, systems, or any combination thereof. One or more hardware processors may include one or more central processing units, multi-core processors, front-end processors, the like, or any combination thereof. The one or more processors may be non-transient. The one or more processors may be referred to as one or more electronic processors. The one or more processors may convert data signals to data entries to be saved within one or more storage mediums. A data signal may be a signal associated with an input from a user interface. A data entry may be an entry stored within one or more databases. The one or more processors may access one or more algorithms, processes, and/or methods to analyze one or more data entries and/or data signals. The one or more processors may access one or more algorithms saved within one or more memory storage mediums.

One or more computing devices may include one or more memory storage devices (e.g., electronic memory storage device). The one or more memory storage devices may store data, databases, algorithms, processes, methods, or any combination thereof. The one or more memory storage devices may include one or more hard drives (e.g., hard drive memory), chips (e.g., Random Access Memory "RAM)"), discs, flash drives, memory cards, the like, or any combination thereof. One or more discs may include one or more floppy diskettes, hard disk drives, optical data storage media including CD ROMs, DVDs, and the like. One or more chips may include ROMs, flash RAM, EPROMs, hardwired or preprogrammed chips, nanotechnology memory, or the like. The one or more memory storage devices may include one or more cloud-based storage devices. The data stored within one or more memory storage devices may be compressed, encrypted, or both. The one or more memory storage devices may be located within computing device. One or more memory storage devices may be referred to as one or more electronic memory storage devices. One or more memory storage devices may be non-transient. One or more memory storage mediums may store one or more data entries in a native format, foreign format, or both. One or more memory storage mediums may store data entries as objects, files, blocks, or a combination thereof. The one or more memory storage mediums may include one or more algorithms, methods, rules, databases, data entries, the like, or any combination therefore stored therein. The one or more memory storage mediums may store data in the form of one or more databases. One or more memory storage devices may include one or more instruction algorithms. One or more instruction algorithms may contain computer executable instructions for generating one or more outputs from one or more media devices. One or more executable instructions may be configured to instruct a media control device, such that the media control device is able to instruct and direct one or more media devices. One or more control algorithms may be stored within one or more control servers, media control devices, or both. The one or more control algorithms may be stored on one or more storage mediums, accessible and executable by one or more processors, or both. The one or more control algorithms may provide computer executable instructions to generate, change and/or end one or more outputs of the one or more media devices.

Method

The present teachings also relate to a method. The method may utilize and/or work in conjunction with one or more components of the system as disclosed herein. The method may be particularly useful in allowing users to interface with media devices within a facility without requiring direct contact with any equipment or controls part of the facility, with their own computing device (e.g., user mobile device), or both. The method may allow for conducting a transaction while in proximity of a facility, retail establishment, and/or local retail network. The method may be completed by a point of sale, such as at the retail establishment. The method may include one or more of: a) receiving an identification signal related to one or more media identifiers, b) transmitting data to the user mobile device to render a media control interface on the user mobile device, c) receiving one or more instruction signals from the user mobile device, d) transmitting one or more instruction signals to a media control device, and e) disabling a connection between the user mobile device and the media control device. The method may include one or more of: a) receiving an identification signal related to one or more media identifiers associated with a media control device and from a user mobile device, wherein the user mobile device is connected to a user network; b) transmitting data to the user mobile device to render a media control interface on the user mobile device; c) receiving one or more instruction signals from the user mobile device, wherein the one or more instruction signals are related to one or more outputs of one or more media devices in proximity to the user mobile device; d) transmitting the one or more instruction signals to a media control device, such that the media control device instructs the one or more media devices to generate the one or more outputs; and e) disabling a connection between the user mobile device and the media control device based upon occurrence of a pre-determined condition. The method may include one or more of: a) establishing a connection with one or more media devices and one or more control servers via the local retail network, and wherein the one or more media devices are located at the retail point of sale; b) receiving one or more instruction signals from the control server and establishing an indirect connection with a user mobile device, wherein the one or more instruction signals originate from the user mobile device connected to a user network; c) transmitting the one or more instruction signals to the one or more media devices to generate one or more outputs of the one or more media devices; and d) disconnecting the indirect connection with the user mobile device upon the occurrence of a pre-determined condition.

The method and system of the present teachings may include one or more of the following in any combination: the identification signal may be received by one or more image sensors, frequency sensors, or both; the one or more media identifiers may be one or more graphic identifiers, frequency identifiers, or both; the one or more graphic identifiers may include one or more quick response (QR) codes, universal product code (UPC), barcodes, bokodes, the like, or any combination thereof; the one or more frequency identifiers may include radio frequency identification tags, Bluetooth® beacons, near field communication (NFC) tags, or any combination thereof; the one or more media identifiers may be static, dynamic, or both; the one or more media identifiers may be automatically changed upon disabling the connection between the user mobile device and the media control device; the one or more media identifiers may be randomly generated; the one or more media identifiers may not reused (i.e., repeated) to identify a media device at the retail point of sale for a pre-determined period of time; the predetermined period of time may be about one day to about one year; the user network may be separate from and not in direct communication with the local retail network; the user network may be a wide area network, wireless network, local area network, inter network, the like, or a combination thereof; the user network may be a cellular network, local guest network, or both; the user network may have an operational radius of 1 km or greater; the user network may transmit communications via radiofrequency other than 2.4 GHz, 5 GHz, or both; the user network may transmit communications at frequencies below 4 GHz, 3 GHz, 2 GHz, or even 1 GHz; the user network may transmit communications at frequencies of about 600 MHz; the user network may be a third generation (3G) network, fourth generation (4G) network, long-term evolution network, fifth generation (5G) network, subsequent generation network, the like, or a combination thereof; the user network may be a low-band network (e.g., about 600-700 MHz); the user network may provide download speeds higher than about 30 Mbps, 50 Mbps, or even 100 Mbps; the user network may be a mid-band network (e.g., about 2.5-3.7 GHz); the user network may provide download speeds higher than about 100 Mbps, about 500 Mbps, or even about 900 Mbps; the user network may be a high-band network (e.g., about 25-39 GHz); the user network may provide download speeds higher than about 1 Gbps; the user network may be in communication with an external network via one or more cellular networks; the external network may be in communication with one or more control servers; the one or more control servers may receive the identification signal from the user mobile device; the user mobile devices my receive the data via the user network; the user mobile device may be a personal computing device; the personal computing device may include a mobile phone, tablet, laptop, watch, or a combination thereof; the user mobile device may include a graphic user interface (GUI) capable of displaying the media control interface and allowing a user to provide one or more instruction inputs; the media control interfaces may include one or more webpages, dedicated applications, or both; the media control interface may display information related to the one or more media devices; the media control interface my display controls associated with the one or more outputs of the one or more media devices; one or more instruction inputs may include one or more interactions between a user and the media control interface; the one or more instruction inputs may include one or more tactile inputs, audio inputs, optical inputs, or a combination thereof; the one or more instruction inputs may include one or more control commands to generate, change, and/or end the one or more outputs of one or more media devices; proximity of the user mobile device to the one or more media devices may include being within a pre-determined distance of the one or more media devices, being within the same retail point of sale as the one or more media devices, being within a shared geo-fence as the one or more media devices, the user network having a range which extends over the retail point of sale, or any combination thereof; the user mobile device may convert one or more instruction inputs to one or more instruction signals adapted for transmission over the user network; the one or more instruction signals are transmitted via a user network; the user network may be in two-way communication with an external network; the one or more instruction signals may be received via the external network; the one or more instruction signals may be transmitted toward the media control device via an external network, the local retail network, or both; the external network may be in two-way communication with the local retail network; the one or more instruction signals may be received and transmitted by a control server; the control server may include one or more control algorithms stored therein which may provide one or more executable instructions to generate, change, and/or end the one or more outputs of the one or more media devices; the control server associates the one or more instruction signals to one or more control algorithms; the executable instructions may be configured to instruct the media control device, such that media control device may be able to instruct the one or more media devices; the one or more media devices may include a device able to be controlled via one or more analog instructions, digital instructions, or both; the one or more media devices may include one or more home appliances, fitness devices, entertainment devices, computing devices, imaging devices, communication devices, audio devices, gaming devices, wearable devices, vehicles, vehicle devices, wearable devices, toys, or any combination thereof; the one or more outputs may include one or more sensory outputs able to be sensed by an individual; the one or more outputs may include one or more images, sounds, tactile feedback, scents, the like, or any combination thereof; the one or more media devices may be in communication with the media control device; the one or more media devices may be in one-way communication with the media control device; the pre-determined condition which may disable the connection may include: a user closing the media control interface on the user mobile device, the media control interface being inactive for a pre-set time, the media control interface being active over a pre-set period of time, the user mobile device leaving the proximity of the one or more media devices, the user mobile device leaving the retail point of sale, the user attempting to complete an unacceptable behavior via the media control interface, disconnecting of the user mobile device by an administrator of the media control device, the user disconnecting from the user network, a subsequent user overriding the user, or any combination thereof; disabling of the connection may be automatic upon the occurrence of the pre-determined condition; proximity of the user mobile device to the one or more media devices may include being within a pre-determined distance of the one or more media devices, being within the same retail point of sale as the one or more media devices, being within a shared geo-fence as the one or more media devices, the user network having a range which extends over the retail point of sale, or any combination thereof; the pre-set time may be about 1 minute or greater, about 2 minutes or greater, or even about 5 minutes or greater; the pre-set time may be about 15 minutes or less, about 12 minutes or less, or even about 10 minutes or less; the one or more media identifiers may only be valid for a pre-set period of time upon receiving the identification signal, disabling the connection, or both; the pre-set period of time may be about 1 minute or greater, about 2 minutes or greater, or even about 5 minutes or greater; the pre-set period of time may be about 10 hours or less, about 8 hours or less, about 4 hours or less, about 2 hours or less, about 1 hour or less, or even about 30 minutes or less; the one or more media identifiers may be only valid while a user mobile device is within proximity of the one or more media devices; receiving the identification signal, upon disabling of the connection, or both, the one or more media identifiers associated with the one or more media devices may be invalid and refreshed with one or more replacement media identifiers; the local retail network may include a wireless network, local area network, or both; the local retail network may be in communication with an external network; the local retail network may be in two-way communication with the external network; the local retail network may be in communication with a control server via the external network; the local retail network may be encrypted; the local retail network may not permit for access by the user mobile device; the data may be encrypted from a control server to an onsite network to the media control device; steps a-d may be repeated for one or more subsequent users and subsequent user mobile devices; one or more subsequent users and subsequent user mobile devices may join one or more users and user mobile devices in a cooperative experience on one or more media devices.

The method may include receiving an identification signal. The identification signal may function to carry data related to a media identifier, media device, media control device, media control interface, the like, or any combination thereof interact with one or more user mobile devices; or any combination thereof. The one or more identification signals may be related to one or more media identifiers. The identification signal may be received by one or more image sensors, frequency sensors, or both. The identification signal may be received by a user mobile device, control server, or both. The identification signal may be generated automatically or upon initiation of a user. Automatic may occur when a user passes by the media identifier, is within a certain proximity of the media identifier, or both. Proximity and passing distance of a user mobile device relative to a media identifier may be 1 foot or greater, 2 feet or greater, 3 feet or greater, or even 5 feet or greater. Proximity and passing distance of a user mobile device relative to a media identifier may be 25 feet or less, 20 feet or less, 15 feet or less. A proximity and/or passing distance may be referred to as a pre-determined distance. Upon initiation may occur upon a user having their user mobile device interact with the media identifier. Interaction may include taking a photo (e.g., of a media identifier, such as a graphic identifier), establishing a connection (e.g., with a media identifier, such as a frequency identifier), or both. A connection may be a wireless connection with a frequency identifier. For example, a connection may be a Bluetooth® connection, near field communication (NFC), radio frequency communication, the like, or a combination thereof. The user mobile device may be connected to a network. The user mobile device may be simultaneously connected to and in communication with a network and to a media identifier (e.g., frequency identifier). The user mobile device may be connected to a user network. The user mobile device may be connected to a guest network at the facility (e.g., retail location), a cellular network, or both. The one or more identification signals may be received by a control server. The one or more identification signals may be transmitted from a user mobile device to a control server. The one or more identification signals may be transmitted via a user network to an external network. The one or more identification signals may be automatically transmitted from the user mobile device. One or more processors of a user mobile device may automatically transmit the one or more identification signals upon establishing a connection with one or more media identifiers. Automatic transmission may occur immediately upon the user mobile device establishing a connection with a media identifier. Immediately may be less than a near instantaneous time frame.

The method may include transmitting data to a user mobile device. The data may allow for a media control interface to be generated on a user interface of a user mobile device. The data may allow for a user mobile device to establish a connection with a control server. The user mobile device may receive the data via one or more networks. The data may include one or more uniform resource locators (URL), application information, computer readable and executable instructions, or a combination thereof. The data may include a URL associated with a media control interface. The data may include the URL of the media control interface, control server, or both. The data may cause a media control interface to open (e.g., be displayed) on a user mobile device. A media control interface may be automatically generated on the user mobile device. One or more processors of the user mobile device upon receiving the data may process and execute the data and automatically open the media control interface on the user mobile device. The data may cause a web browser to open. The data may cause a webpage having the media control interface thereon to be opened in a web browser of a user mobile device. The one or more networks may include a guest network at a retail location, a cellular network, or both. Communication between a control server and a user device may be automatically generated. Data may be automatically transmitted from one or more control servers to one or more user devices. One or more processors of the control server and/or the user device may automatically establish the communication. For example, upon the control server automatically receiving one or more identification signals, the control server may automatically transmit the data to the user mobile device. Communication between a control server and a user device may be secure. Security may be provided by one or more protocols. The communication may be over secure HTTP ("HTTPS") (HyperText Transfer Protocol Secure), user transport layer security (TLS), or both. The connection between the user mobile device and the control server may be continuous, intermittent, or both. Continuous may mean a connection which is unbroken. Intermittent may mean the connection includes breaks (e.g., moments without communication between the devices). A continuous and secure connection may allow for one or more instruction signals from a media control interface to be quickly interpreted by a control server and be transmitted toward one or more media control devices, media devices, or both.

The method may include receiving one or more instruction signals. One or more instruction signals may allow for a user to control one or more outputs of one or more media devices via a user mobile device. One or more instruction signals may be related to one or more outputs of one or more media devices. One or more instruction signals are associated with one or more instruction inputs. One or more instruction inputs may be received on one or more media control interfaces, user mobile device, or both. One or more instruction inputs may be provided by a user. For example, a user may provide one or more instruction inputs to a media control interface of a user mobile device. The instruction input may be an input from a user interacting with the media control interface. One or more instruction inputs may include one or more control commands to generate, change, and/or end one or more outputs of one or more media devices. The user mobile device may convert the one or more instruction inputs to one or more instruction signals. Conversion may be automatic. Conversion may be automatically completed by one or more processors of one or more computing devices (e.g., user mobile device) associated with the media control interface. Conversion may allow for the instruction signals to be easily transmitted over a user network, external network, or both. The one or more instruction signals may be transmitted via a user network, external network, or both. The one or more instruction signals may be automatically transmitted. Automatic transmission may be initiated by one or more processors (e.g., user mobile device processor(s)). The one or more instruction signals may be received by an external network. The instruction signals may be received by a control server. The control server may be connected to the external network, a local retail network, or both. One or more instruction signals may be received while a user mobile device is in proximity of one or more media devices. Proximity may include a predetermined distance from the one or more media devices, being within the same retail establishment as the one or more media devices, being within a shared geo-fence as the one or more media devices, a user network having a range which extends and/or overlaps over the retail location, a user network part of a retail guest network of the retail location, the like, or any combination thereof.

The method may include transmitting one or more instruction signals. Transmission of the one or more instruction signals may allow for one or more outputs to be generated from one or more media devices. Transmitting may allow for the media control device to instruct one or more media devices to generate the one or more outputs. The one or more instruction signals may be transmitted toward the media control device via an external network, onsite network (e.g., "local retail network"), or both. The one or more instruction signals may be transmitted from one or more control servers, toward one or more media control devices, or both. A control server may associate one or more instruction signals with one or more control algorithms. Transmission, association, or both may be automatic, completed by a processor, or both. A processor of the control server upon receiving one or more instruction signals from one or more media control interfaces (e.g., user mobile device) may then automatically transmit the one or more instruction signals toward a media control device. The one or more processors may associate with the one or more instruction signals with one or more control algorithms stored in the server, the media control device, or both. The connection between the control server and the one or more media control devices, media devices, or both may be continuous, intermittent, or both. Continuous may mean a connection which is unbroken. Intermittent may mean the connection includes breaks (e.g., moments without communication between the devices). A continuous and secure connection may allow for one or more instruction signals from a control server to be quickly received and interpreted by a media control device and be transmitted toward one or more media devices. The continuous and secure connections between the user mobile device and the control server, and the control server to the media control devices, allows for instruction inputs on a user mobile device to be quickly rendered as media outputs within a near instantaneous time frame allow for enjoyment by the user. The near instantaneous time frame may allow for a user to sense that they are immediately causing the actions on a media device without noticing a lag. A near instantaneous time frame may be about 0.01 seconds or greater, about 0.05 seconds or greater, or even about 0.1 second or greater. A near instantaneous time frame may be about 0.5 seconds or less, about 0.4 seconds or less, or even about 0.2 seconds or less.

The method may include disabling a connection between the user mobile device and the media control device. Disabling a connection may prevent for accidental control of one or more media devices after completing a user experience, preventing malicious access once a user is located remote from the media devices, allow for other users to interact with the media devices, or any combination thereof. Disabling may be based upon an occurrence of a pre-determined condition. A pre-determined condition may include a user closing and/or exiting the media control interface on the user mobile device (e.g., closing an application, closing a browser), the media control interface being inactive for a pre-set time, the media control interface being active over a pre-set period of time, the user mobile device leaving the proximity of the one or more media devices, the user mobile device leaving the retail establishment (e.g., point of sale), the user attempting to complete an unacceptable behavior (e.g., malicious, mischievous) via the media control interface, disconnecting of the user mobile device by an administrator of the media control device, the user disconnecting from the user network, a subsequent user overriding the user, the like, or any combination thereof. Disabling may be manual, automatic, or both. Manual may be completed by the user, personnel of the facility, or both. Disabling the connection may be automatic upon the occurrence of a pre-determined condition. One or more processors of the user mobile device, control server, media control device, or combination thereof may automatically monitor and determine if a pre-determined condition is achieved. Proximity may include a pre-determined distance from the one or more media devices, being within the same retail establishment as the one or more media devices, being within a shared geo-fence as the one or more media devices, a user network having a range which extends and/or overlaps over the retail location, a user network part of a retail guest network of the retail location, the like, or any combination thereof. A pre-set time may be about 1 minute or greater, about 2 minutes or greater, or even about 5 minutes or greater. A pre-set time may be about 15 minutes or less, about 12 minutes or less, or even about 10 minutes or less.

The method may include updating one or more media identifiers. Updating one or more media identifiers allows for user control of one or more media devices to be controlled, allows for users to have limited access to a media device, or both. The one or more media identifiers may be randomly generated. The one or more media identifiers may be generated by one or more control servers, media control devices, or both. The one or more media identifiers may be generated by one or more processors of one or more control servers, media control devices, or both. Instruction may be accessed from one or more storage mediums of the one or more control serves, media control devices, or both. The one or more media identifiers may be automatically changed after rendering of a media control interface on a user mobile device occurs, upon disabling the connection between the user mobile deice and the media control device, or both. The one or more media identifiers may only be valid for a pre-set period of time upon the identification signal being sent to a user mobile device, a media control interface being accessed, disabling the connection between the user mobile device and the media control device and/or media device, or a combination thereof. The pre-set period of time may be about 1 minute or greater, about 2 minutes or greater, or even about 5 minutes or greater. The pre-set period of time may be about 10 hours or less, about 8 hours or less, about 4 hours or less, about 2 hours or less, about 1 hour or less, or even about 30 minutes or less. The one or more media identifiers may only be valid while a user mobile device is within a proximity of the one or more media devices. The one or more media identifiers may not be reused (i.e., repeated) to identify a media device for a pre-determined period of time. The predetermined period of time may be about 1 day or greater, abut 1 week or greater, about 1 month or greater. The predetermined period of time may be about 5 years or less, about 3 years or less, or even about 1 year or less.

The method may include generating one or more customer service requests. One or more customer service requests may provide for users to be provided with in-person assistance. After an individual has been interacting with a media control interface for over a pre-determined period of time, a customer service signal may be generated. A customer service signal may be generated by the user mobile device, control server, media control device, or any combination thereof. A customer service signal may be generated by one or more inputs from user to a media control interface. One or more processors associated with the media control interface (e.g., part of the user mobile device, control server, or media control device) may convert the input into a customer service signal. The customer service signal may be automatically transmitted to one or more computing devices at a facility such as to alert one or more personnel of the facility. The one or more customer service signals may alert one or more individuals at the retail establishment to provide in-person assistance to the user. The one or more customer service signals may identify the media device, media control device, precise location within a retail establishment, or any combination thereof with which the user is interacting.

The method may include storing data associated with the user's interaction with the media control interface. Data may be transmitted from a media control interface, media control device, mobile user device, or any combination thereof to one or more retailer computing devices, control server, or both. Data may include any data useful for tracking consumer trends. Data may include duration of interaction, input signals received, outputs generated, number of interactions, repeat interactions, user demographics, the like, or any combination thereof. Data may be stored in one or more storage mediums.

The method may be allowed to be repeated for additional user mobile devices. By allowing additional user mobile devices to establish a connection with the one or more media devices, two or more users may be able to enjoy an interactive experience together. Additional users may follow a similar method to establish a connection with one or more media devices. Multi-user experiences may include the one or more media control interfaces initiating a trivia game, video game, joint menu ordering menu (e.g., ordering food together, such as shared small plates or tapas), other shared experiences, or any combination thereof. For example, one or more media devices may display one or more questions. Two or more media control interfaces may in response display one or more answers related to the questions. Users may select one or more answers via their media control interface. As another example, one or more media devices may display two or more characters of a video game. The two or more media control interfaces may display one or more controls of the one or more characters. The multi-user experience may provide competitive incentives specific to the retail establishment. For example, depending on user inputs, one or more users may receive one or more rewards, coupon, discounts, the like, or a combination thereof related to the retail establishment, media device, or both.

ILLUSTRATIVE EXAMPLES

Figure 2:
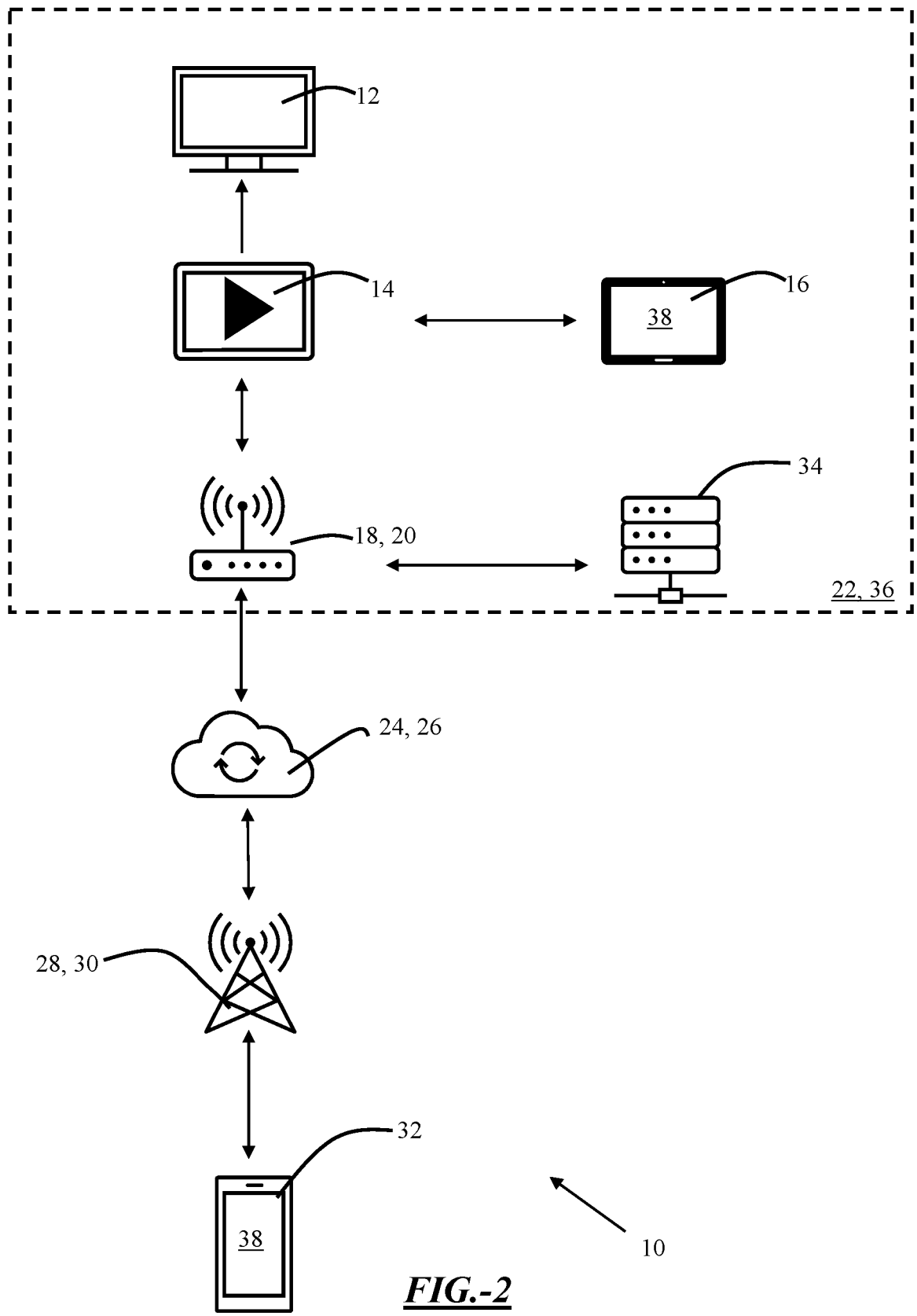
FIG. 2 illustrates a network schematic with a media control device on a retail network in communication with a user mobile device on a separate network.

FIGS. 1 and 2 illustrate a network schematic for a system 10. The system 10 includes a media device 12. The media device 12 is in one-way communication with a media control device 14. The media control device 14 can be in direct one-way communication (as shown in FIG. 1) or (as shown in FIG. 2) two-way communication with an onsite user interface 16. The onsite user interface 16 includes a media control interface 38. The media control device 14 is in two-way communication with an onsite network 18. The onsite network 18 may be a local retail network 20. The media device 12, media control device 14, onsite network 18, and onsite user interface 16 may all be located within a same facility 22. The facility 22 may be a retail point-of-sale location 36.

The onsite network 18 is in two-way communication with an offsite network 24 (e.g., "external network"). The offsite network 24 may be the Internet 26. As illustrated in FIG. 1, the offsite network 24 is in two-way communication with a control server 34. As an alternative, the control server 34 may be in direct two-way communication with the onsite network 18, such as illustrated in FIG. 2. For example, the control server 34 may be located within the facility 22. The offsite network 24 is in two-way communication with a separate network 28. The separate network 28 may be a cellular network 30. The cellular network 30 is in two-way communication with a user mobile device 32. The user mobile device 32 includes a media control interface 38.

As illustrated, the user mobile device 32 is able to control the media device 12 by communicating one or more instruction signals to the control server 34. Communication may be through the cellular network 30 and the Internet 26. The user mobile device 32 may be capable of receiving one or more instruction inputs and converting the instructions inputs to one or more instruction signals. The control server 34 is able to transmit the one or more instruction signals to the media control device 14 via the Internet 26 and the onsite network 18. The media control device 14 is then able to change one or more outputs of the media device 12 based on the one or more instruction signals from the user mobile device 32.

Figure 3:
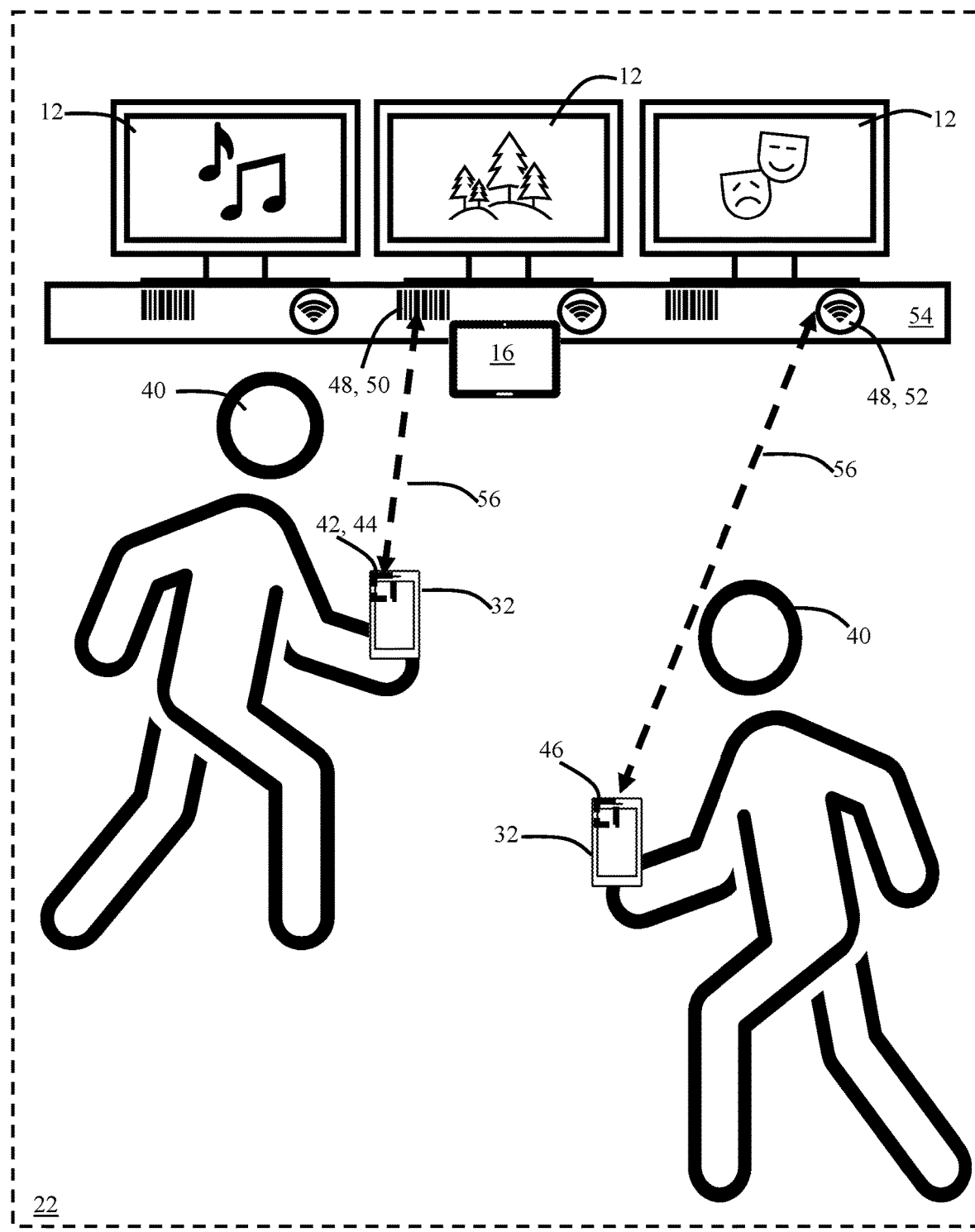
FIG. 3 illustrates users interacting with media devices at a retail location.

FIG. 3 illustrates users 40 interacting with media devices 12 at a facility 12. Each user 40 has a user mobile device 32. At least one user mobile device 32 includes a camera 42. The camera 42 includes an image sensor 44. At least one user mobile device 32 includes a frequency sensor 46. The image sensor 44 captures an image of a media identifier 48. The media identifier 48 is a graphic identifier 50, such as in the form of a barcode. The frequency sensor 46 establishes communication with a media identifier 48. The media identifier 48 is a frequency identifier 52, such as in the form of a Bluetooth® beacon. The media identifiers 48 are located on a display shelf 54 with the media devices 12 thereon. The display shelf 54 also includes an onsite user interface 16. Upon the image sensor 44 capturing the media identifier 48 and/or the frequency sensor 46 communicating with the media identifier 48, an identification signal 56 is received by the user mobile device 32.

Figure 4:
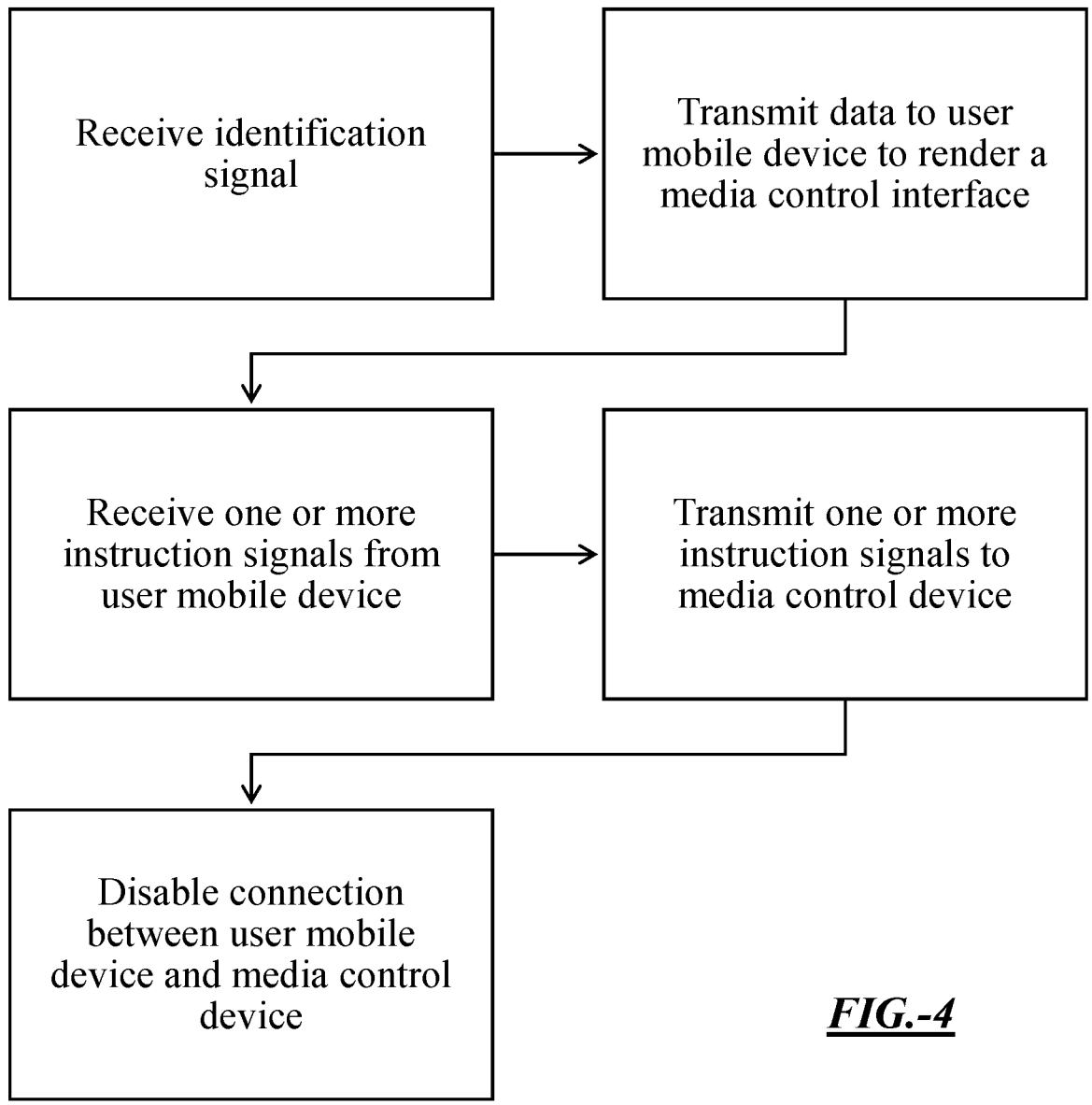
FIG. 4 illustrates a flow of a method for conducting a transaction.

FIG. 4 illustrates a method for conducting a transaction while in proximity of a local retail network. The method may be completed by a control server of a system, or a combination of components of a system according to the teachings herein. The method includes receiving an identification signal related to one or more media identifiers associated with a media control device and from a user mobile device. The user mobile device may be connected to a user network. Upon receiving the identification signal, transmitting data to the user mobile device. The data may render a media control interface on the user mobile device. Thereafter, the control server may receive one or more instruction signals from the user mobile device. The one or more instruction may be related to one or more outputs of one or more media devices in proximity to the user mobile device. Upon receiving the one or more instruction signals, the control serve may then transmit the one or more instruction signals to a media control device. The media control device may then instruct one or more media devices to generate one or more outputs associated with the instruction signals. Finally, the control server may disable a connection between the user mobile device and the media control device. This disabling may occur upon the occurrence of a pre-determined condition. The method may be completed by a processor of the control server.

REFERENCE NUMBER LISTING

10—System
12—Media device
14—Media control device
16—Onsite user interface
18—Onsite network
20—Local retail network
22—Facility
24—Offsite network
26—Internet
28—Separate Network
30—Cellular network
32—User mobile device
34—Control server
36—Retail point-of-sale location
38—Media control interface
40—User
42—Camera
44—Image sensor
46—Frequency sensor
48—Media identifier
50—Graphic identifier
52—Frequency identifier
54—Display shelf
56—Identification signal Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time, distance, and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate.

These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method for operating one or more media devices at a retail point of sale with a user mobile device, the method comprising:
    a) one or more control servers receiving an identification signal from the user mobile device, wherein the identification signal is related to one or more media identifiers associated with a media control device, wherein the user mobile device is connected to a user network;
    b) in response to the receiving of the identification signal, the one or more control servers transmitting data to the user mobile device to render a media control interface on the user mobile device and placing the user mobile device in controlling communication with the media control device;
    c) receiving by the one or more control servers one or more instruction signals from the user mobile device, wherein the one or more instruction signals are based on a user input on the media control interface rendered on the user mobile device and the user input is a selection of one or more outputs of the one or more media devices in proximity to the user mobile device;
    d) transmitting by the one or more control servers the one or more instruction signals which were received to the media control device, such that the media control device instructs the one or more media devices to generate the one or more outputs of the one or more media devices which were selected by the user input; and
    e) disabling by the one or more control servers the controlling communication between the user mobile device and the media control device based upon occurrence of a pre-determined condition;
        wherein the media control interface displays controls associated with the one or more outputs of the one or more media devices; and
        wherein one or more instruction inputs include one or more control commands configured to generate, change, and/or end the one or more outputs of the one or more media devices.

2. The method of claim 1, wherein the identification signal is received by one or more image sensors, one or more frequency sensors, or both of the user mobile device.

3. The method of claim 1, wherein the one or more media identifiers are one or more graphic identifiers, one or more frequency identifiers, or both.

4. The method of claim 3, wherein the one or more graphic identifiers include one or more quick response (QR) codes, one or more universal product codes (UPC), one or more barcodes, one or more bokodes, or any combination thereof; and
    wherein the one or more frequency identifiers include one or more radio frequency identification tags, one or more bluetooth beacons, one or more near field communication (NFC) tags, or any combination thereof.

5. The method of claim 3, wherein the one or more media identifiers are static, dynamic, or both.

6. The method of claim 1, wherein the one or more media identifiers are affixed to, on display as part of, or both the one or more media devices, the media control device, or both.

7. The method of claim 1, wherein the user network is a wide area network, wireless network, local area network, inter network, or a combination thereof.

8. The method of claim 7, wherein the user network is a cellular network, a local guest network, or both.

9. The method of claim 1, wherein the user network is in communication with an external network via or one more cellular networks, one or more or local guest networks, or both; and
    wherein the external network is in communication with the one or more control servers.

10. The method of claim 1, wherein the user mobile device receives the data via the user network.

11. The method of claim 1, wherein the user mobile device is a personal computing device; and
wherein the personal computing device includes a mobile phone, a tablet, a laptop, a watch, or a combination thereof.

12. The method of claim 11, wherein the user mobile device includes a graphic user interface (GUI) configured to display the media control interface and allow a user to provide the one or more instruction inputs to the media control interface.

13. The method of claim 12, wherein the media control interface includes one or more webpages, one or more dedicated applications, or both.

14. The method of claim 1, wherein the pre-determined condition to disable the connection includes:
a user closing the media control interface on the user mobile device,
the media control interface being inactive for a pre-set time,
the media control interface being active over a pre-set period of time,
the user mobile device leaving a proximity of the one or more media devices,
the user mobile device leaving the retail point of sale,
the user attempting to complete an unacceptable behavior via the media control interface,
disconnecting of the user mobile device by an administrator of the media control device,
the user disconnecting from the user network,
a subsequent user overriding the user, or
any combination thereof.

15. The method of claim 1, wherein the one or more media identifiers are one or more graphic identifiers include one or more quick response (QR) codes, one or more universal product codes (UPC), one or more barcodes, one or more bokodes, or any combination thereof.

16. The method of claim 15, wherein the one or more media identifiers are displayed on the one or more media devices.

17. The method of claim 1, wherein the one or more outputs of the one or more media devices include one or more images, one or more sounds, or both; and
wherein the one or more outputs are configured for the user to learn more about the one or more media devices.

18. A method for operating one or more media devices at a retail point of sale with a user mobile device, the method comprising:

a) one or more control servers receiving an identification signal from the user mobile device, wherein the identification signal is related to one or more media identifiers associated with a media control device, wherein the user mobile device is connected to a user network;

b) in response to the receiving of the identification signal, the one or more control servers transmitting data to the user mobile device to render a media control interface on the user mobile device and placing the user mobile device in controlling communication with the media control device;

c) receiving by the one or more control servers one or more instruction signals from the user mobile device, wherein the one or more instruction signals are based on a user input on the media control interface rendered on the user mobile device and the user input is a selection of one or more outputs of the one or more media devices in proximity to the user mobile device;

d) transmitting by the one or more control servers the one or more instruction signals which were received to the media control device, such that the media control device instructs the one or more media devices to generate the one or more outputs of the one or more media devices which were selected by the user input; and e) disabling by the one or more control servers the controlling communication between the user mobile device and the media control device based upon occurrence of a pre-determined condition; and wherein the one or more media identifiers are affixed to, on display as part of, or both the one or more media devices, the one or more media control devices, or both;

wherein the one or more media identifiers are one or more graphic identifiers, one or more frequency identifiers, or both;

wherein the media control interface displays controls associated with the one or more outputs of the one or more media devices; and wherein one or more instruction inputs include one or more control commands configured to generate, change, and/or end the one or more outputs of the one or more media devices.

* * * * *